(12) United States Patent
Delker et al.

(10) Patent No.: US 9,275,405 B1
(45) Date of Patent: Mar. 1, 2016

(54) CONTENT PROVIDER SPONSORED DATA SERVICES SYSTEM AND METHODS

(75) Inventors: Jason R. Delker, Olathe, KS (US); John M. Everson, Leawood, KS (US); Sei Y. Ng, Olathe, KS (US); Jason K. Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 995 days.

(21) Appl. No.: 12/417,081

(22) Filed: Apr. 2, 2009

(51) Int. Cl.
*G06F 15/16* (2006.01)
*G06Q 30/04* (2012.01)
*H04M 15/00* (2006.01)

(52) U.S. Cl.
CPC .............. *G06Q 30/04* (2013.01); *H04M 15/00* (2013.01)

(58) Field of Classification Search
USPC ........ 709/227, 228, 229; 705/34, 40; 455/405
See application file for complete search history.

(56) References Cited

U.S. PATENT DOCUMENTS

| | | | |
|---|---|---|---|
| 5,003,584 A * | 3/1991 | Benyacar et al. ............. | 379/119 |
| 5,732,216 A | 3/1998 | Logan et al. | |
| 6,947,531 B1 | 9/2005 | Lewis et al. | |
| 7,945,952 B1 | 5/2011 | Behforooz | |
| 8,265,610 B1 | 9/2012 | Delker et al. | |
| 8,401,529 B1 | 3/2013 | Delker et al. | |
| 9,123,062 B1 | 9/2015 | Delker et al. | |
| 2001/0048737 A1 | 12/2001 | Goldberg et al. | |
| 2004/0107139 A1 | 6/2004 | Shibanuma | |
| 2004/0110486 A1 * | 6/2004 | Sobel ............................ | 455/405 |
| 2004/0203613 A1 | 10/2004 | Zhu et al. | |
| 2005/0177506 A1 * | 8/2005 | Rissanen ........................ | 705/40 |
| 2005/0283475 A1 | 12/2005 | Beranek et al. | |
| 2007/0027852 A1 | 2/2007 | Howard et al. | |
| 2007/0060099 A1 * | 3/2007 | Ramer et al. ................... | 455/405 |
| 2007/0105529 A1 * | 5/2007 | Lundstrom et al. ............ | 455/405 |
| 2007/0116227 A1 | 5/2007 | Vitenson et al. | |
| 2008/0010133 A1 | 1/2008 | Pyhalammi et al. | |
| 2008/0103971 A1 * | 5/2008 | Lukose et al. ................... | 705/40 |
| 2008/0170676 A1 | 7/2008 | Douma et al. | |
| 2008/0254774 A1 | 10/2008 | Lee | |
| 2008/0305775 A1 | 12/2008 | Aaltonen et al. | |
| 2010/0030901 A1 | 2/2010 | Hallberg et al. | |
| 2010/0191608 A1 * | 7/2010 | Mikkelsen et al. ............. | 705/26 |
| 2010/0222035 A1 | 9/2010 | Robertson et al. | |
| 2010/0279667 A1 | 11/2010 | Wehrs et al. | |
| 2010/0303227 A1 | 12/2010 | Gupta | |
| 2011/0295980 A1 | 12/2011 | Aldis et al. | |
| 2012/0016735 A1 | 1/2012 | Park et al. | |

OTHER PUBLICATIONS

Office Action dated Jun. 21, 2011, U.S. Appl. No. 12/470,352, filed May 21, 2009.
Delker, Jason R., et al., Patent Application entitled "Ad Sponsored Communication Pack," filed Feb. 18, 2011, U.S. Appl. No. 13/031,123.

(Continued)

*Primary Examiner* — Hua Fan
*Assistant Examiner* — Nicholas Celani

(57) ABSTRACT

A method of providing data communication services is provided. The method comprises a mobile electronic device establishing a data connection to a content source, a gateway creating a record comprising information related to the data connection and providing the record to a server, and the server charging the content source for the data connection and providing at least a part of the record to the content source.

3 Claims, 7 Drawing Sheets

(56) References Cited

OTHER PUBLICATIONS

Breau, Jeremy R., et al., Patent Application entitled "Post-Dial Pre-Connect Advertising and Call Sponsorship," filed May 21, 2009, U.S. Appl. No. 12/470,352.

Delker, Jason R., et al., Patent Application entitled "Sponsored Keyword Usage in Voice Communication," filed Mar. 1, 2010, U.S. Appl. No. 12/715,197.

Advisory Action dated Feb. 6, 2012, U.S. Appl. No. 12/470,352, filed May 21, 2009.

First Action Interview Pre-Interview Communication dated Feb. 22, 2012, U.S. Appl. No. 12/715,197, filed Mar. 1, 2010.

Burcham, Robert H., Patent Application entitled "Multi-Call Ringback Reward Method," filed Nov. 22, 2006, U.S. Appl. No. 11/603,615.

Final Office Action dated Nov. 29, 2011, U.S. Appl. No. 12/470,352, filed May 21, 2009.

Notice of Allowance dated Apr. 25, 2012, U.S. Appl. No. 12/715,197, filed Mar. 1, 2010.

Office Action—Restriction Requirement dated Aug. 26, 2013, U.S. Appl. No. 13/031,123, filed Feb. 8, 2011.

Notice of Allowance dated Nov. 8, 2012, U.S. Appl. No. 13/549,390, filed Jul. 13, 2012.

Office Action dated Dec. 17, 2013, U.S. Appl. No. 13/031,123, filed Feb. 18, 2011.

Office Action dated May 29, 2014, U.S. Appl. No. 12/470,352, filed May 21, 2009.

Notice of Allowance dated Apr. 22, 2015, U.S. Appl. No. 13/031,123, filed Feb. 18, 2011.

Office Action dated Oct. 10, 2014, U.S. Appl. No. 13/031,123, filed Feb. 18, 2011.

Delker, Jason R., et al., Patent Application entitled "Sponsored Keyword Usage in Voice Communication," filed Jul. 13, 2012, U.S. Appl. No. 13/549,390.

* cited by examiner

CONTENT PROVIDER SPONSORED DATA SERVICES SYSTEM AND METHODS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless data communications by mobile phones, personal digital assistants (PDAs), and wireless enabled laptop computers is increasing. Content providers and retailers see wireless browsing as a new source of revenue and sales opportunities and desire for wireless data communications to continue to increase. Some wireless users, however, balk at the moderately high price of wireless data communication services subscription prices.

SUMMARY

In an embodiment, a method of providing data communication services is disclosed. The method comprises a mobile electronic device establishing a data connection to a content source, a gateway creating a record comprising information related to the data connection and providing the record to a server, and the server charging the content source for the data connection and providing at least a part of the record to the content source.

In another embodiment, a method of providing data communication services is disclosed. The method comprises a mobile electronic device requesting a data connection to a content source, a gateway creating a record comprising information identifying the content source and the mobile electronic device and providing the record to a server, and the server analyzing the record against a criteria defined by the content source. The method further comprises, when the record satisfies the criteria, the server charging the content source for the data connection and providing at least a part of the record to the content source.

In another embodiment, a method of providing data communication services is disclosed. The method comprises a mobile electronic device establishing a data connection to a content source, a gateway creating a record comprising information identifying the content source and the mobile electronic device and providing the record to a server, and the server analyzing the record against a criteria defined by the content source. The method further comprises, when the record satisfies the criteria, the server charging the content source for the data connection and providing at least a part of the record to the content source and the content source analyzing the at least a part of the record to refine their business process and to optionally update the criteria.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
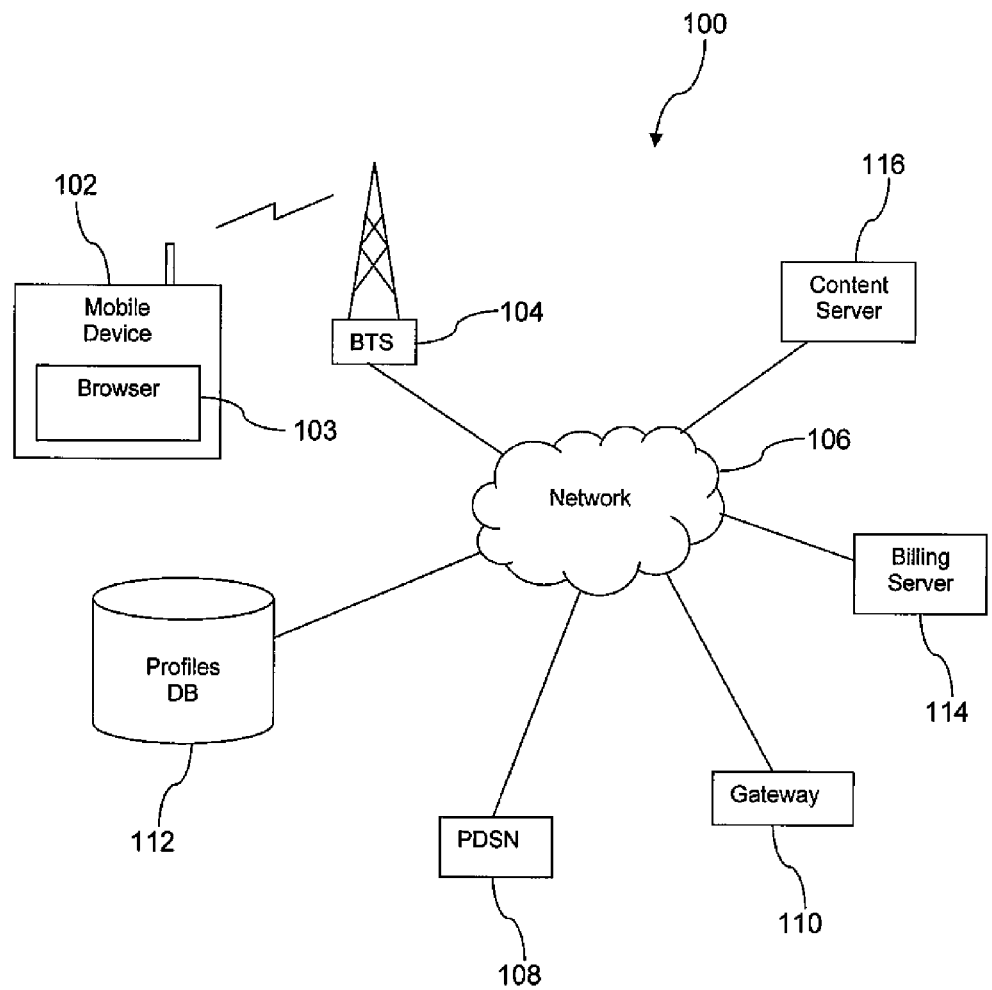
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A system and method of providing data communication services based on reverse billing, wherein service fees for data connections are billed back to content sources and/or content providers rather than to the account of the mobile electronic device that initiated the data connection, is taught by the present disclosure. This reverse billing may be referred to as content provider sponsored data services. In an embodiment, a gateway creates a billing record associated with a data connection opened by the mobile electronic device to the content source and sends the billing record to a billing server or other server. The billing record may initially indicate that the account associated with the mobile electronic device is responsible for paying for the data connection, but the billing server determines that the content source has agreed to pay for the data connection to their content. In an embodiment, all accesses to specific content sources are billed to those specific content sources. In another embodiment, however, content sources may specify a criteria for accepting to be billed for accesses. For example, the criteria may specify a time of day that the content source accepts to be billed for data connections to access its content. The criteria may specify a specific universal reference locator (URL) that the content source accepts to be billed for data connections to access the specific universal reference locator. The criteria may specify a profile of the user of the mobile electronic device that the content source accepts to be billed for data connection to access its content. For example, the content source may accept paying for data connections to its luxury automobile web site from mobile electronic devices associated with a high income individual or an individual with a high level of education. Alternatively, the content source may accept paying for data connections based on a purchasing history associated with the mobile electronic device.

In an embodiment, the billing server or other device in a wireless service provider network accumulates charges for the reverse billing events throughout a cycle and sends a totaled up bill to the content source at the end of the month, along with information about the activity of the mobile electronic device while accessing the content source, for example an amount of time spent browsing a web site of the content source, a number of click-throughs while browsing the web site of the content source, a number of purchases of the mobile electronic device while browsing the web site of the content source, as well as other communication history information associated with the mobile electronic device not connected with browsing the web site of the content source. The information may be valuable to the content source for adjusting or tuning their web site and/or their sales initiatives. The information may be valuable to the content source for adjusting and/or redefining their criteria for accepting reverse billing for data connections from mobile electronic devices.

Turning now to FIG. 1, a system 100 for reverse billing data connections to content sources is described. In an embodiment, the system 100 comprises a mobile electronic device 102, a base transceiver station 104, a network 106, a packet data serving node (PDSN) 108, a gateway 110, a database 112, a billing server 114, and a content server 116. It is understood that the system 100 may comprise additional mobile electronic devices 102, base transceiver stations 104, PDSNs 108, gateways 110, and content servers 116 not shown in FIG. 1. In an embodiment, the system 100 may comprise additional databases 112 and/or additional billing servers 114. In an embodiment, the system 100 enables the mobile electronic device 102 to communicate with the content sever 116 using an Internet browser application 103, hereinafter referred to as the browser 103, to retrieve content for presentation to a user of the mobile electronic device 102. In an embodiment, the system 100 may enable other communication services for the mobile electronic device 102 as well, for example electronic mail (email), other data communication services, and voice communication services.

The mobile electronic device 102 communicates with the base transceiver station 104 via a wireless link using code division multiple access (CDMA), global system for mobile communications (GSM), long term evolution (LTE), universal mobile telecommunications system (UMTS), worldwide interoperability for microwave access (WiMAX), and/or other wireless communication technology. In some contexts, the base transceiver station 104 may be said to provide part of a radio access network (RAN) for a public land mobile network (PLMN). The base transceiver station 104 communicates to the network 106 via either a wired link or a wireless link. The network 106 may be any combination of public switched telephone network (PSTN), packet data network (PDN), and private network.

The mobile electronic device 102 may request content, for example a hyper text markup language (HTML) file comprising a web page, from the content server 116. A content request message may be sent to the packet data serving node 108 which forwards the content request message to the gateway 110. In another embodiment, for example in an embodiment based on a GSM and/or UMTS radio access network, the packet data serving node 108 may be replaced by a general packet radio service (GPRS) gateway support node (GGSN) and/or a serving GPRS node (SGSN) that may perform substantially similar functions. The requested communication service, for example hyper text transport protocol (HTTP) data services and/or Internet data services, may be provided on a subscription basis by a common carrier communication service provider, and the gateway 110 may verify that the mobile electronic device 102 is authorized to receive the requested communication service. Assuming the mobile electronic device 102 is a current subscriber, the gateway 110 may generate a billing record, for example an internet protocol detail record (IPDR), forward the billing record to the billing server 114, and then send the content request message to the content server 116.

The content server 116 may find the requested content and return the content to the gateway 110. The gateway 110 returns the requested content to the packet data serving node 108, and the packet data serving node 108 returns the requested content, for example a hyper text markup language file comprising a web page, to the mobile electronic device 102 for presentation to the user. In an embodiment, the packet data serving node 108, the gateway 110, the billing server 114, and the content server 116 may be implemented on a computer. Computers are discussed in more detail hereinafter. The mobile electronic device 102 may be any of a mobile phone, a personal digital assistant (PDA), a laptop computer, a tablet computer, a media player, and other portable electronic communication devices. A handset that is suitable for implementing some embodiments of the mobile electronic device 102 is discussed in greater detail hereinafter. In some contexts, the billing server 114 may be referred to as a server. In some contexts, the content server 116 may be referred to as a content source. In some contexts, the gateway 110 may be referred to as a media gateway, an access gateway, and/or a media access gateway.

Information about the communication services usage of the mobile electronic device 102 as well as information about the user of the mobile electronic device 102 may be collected by the communication service provider, aggregated as a profile of the user of the mobile electronic device 102, and stored in the database 112. The information may comprise demographic information such as an education level, an income level, a credit score, an age, a marital status, a number of children of the user, and other demographic information. The demographic information may be provided by the user at the time of initial subscription for communication services, by the user responding to a questionnaire or survey, by the communication service provider obtaining the demographic information from a third party provider, and by other methods. The information may comprise historical data of on-line purchases. The information may comprise historical data of content access, for example statistics of visited sites and/or content browsed using the browser 103.

Fees and/or subscription costs for data services customarily have been paid by users of the mobile electronic device 102. While mobile voice communication services have been widely accepted and adopted by the general public, adoption of mobile data communication services and the associated costs of data communication service plans has met with some resistance from the general public. The present disclosure teaches a system and method of content providers paying for data communication services that, at least in part, can overcome this barrier and drive the wide adoption of mobile data communication services by the general public. In an embodiment, the content server 116 may agree to pay the service provider for data communication services associated with the mobile electronic device 102 requesting content from the content server 116. Alternatively, in an embodiment, the service provider may bill the use of data communication service to the account associated with the mobile electronic device 102, and the content server 116 may pay an equivalent amount to cover the charge as a credit on the account with the mobile electronic device 102.

In another embodiment, the content server 116 may provide criteria to the gateway 110 defining conditions under which it will pay the service provider for data communication services associated with the mobile electronic device 102 requesting content from the content server 116. For example, the content server 116 may provide a criteria indicating that data communication requests of the mobile electronic device 102 to access an electronic shopping venue hosted by the content server 116 will be paid by the content provider associated with the content server 116 but that data communication requests of the mobile electronic device 102 to access a digital photograph album hosting venue would not be paid by the content provider associated with the content server 116. As another example, the content server 116 may provide a criteria indicating that data communication requests of the mobile electronic device 102 to access public service content hosted by the content server 116 will be paid by the content provider associated with the content server 116 but that data communication requests of the mobile electronic device 102 to access value added information content hosted by the content server 116, for example stock trend analysis and investment reports written by professional analysts, will not be paid by the content provider associated with the content server 116. A variety of criteria that are based on universal reference locators (URLs) and/or actions requested by the mobile electronic device 102 are contemplated by the present disclosure. The content server 116 may update the criteria to the gateway 110 at the time that the criteria changes or on a periodic basis.

In another embodiment, the content server 116 may provide a criteria to the gateway 110 defining conditions under which it will pay the service provider for data communication services associated with the mobile electronic device 102 requesting content from the content server 116, wherein the criteria is defined, at least in part, with reference to the profile associated with the mobile electronic device 102 in the database 112. For example, a content server 116 hosting an Italian sports car web site may provide a criteria based on a high income level of the user associated with the mobile electronic device 102 attempting to access their web site. As another example, a content server 116 hosting a sporting goods web site may provide, in some alternatives, a criteria based on a previous history of on-line purchases of their sporting goods or of the sporting goods sold by a competitor by the user of the mobile electronic device 102 attempting to access their web site. As another example, the content server 116 may provide a criteria based on a low income level of the user associated with the mobile electronic device 102, on the assumption that high income users already may be subscribed to a data communication plan and would not be deterred from visiting their web site if the communication access was not free. In an embodiment, the content server 116 may provide a criteria that identifies one or more mobile electronic devices 102 for which the content server 116 and/or content provider will not sponsor data sessions based on a purchase history associated with the mobile electronic devices 102, for example a history of few purchases and/or a history of low value of purchases. Alternatively, the criteria may identify one or more mobile electronic devices 102 for which the content server 116 and/or content provider will not sponsor data sessions based on a purchase history of many purchases and/or a history of high value of purchases, on the assumption that the subject user of the mobile electronic device 102 will not be deterred from further purchases by paying for a data connection.

In an embodiment, the content server 116 may update the criteria from time to time, either occasionally as deemed appropriate or periodically. In an embodiment, the content server 116 may monitor an accumulation of data communication sponsorship charges and adjust the criteria accordingly, either to make the criteria more restrictive or less restrictive. The content server 116 may adjust the criteria to steer the accumulation of data communication sponsorship charges towards a monthly budget or to not exceed a monthly budget. The content server 116 may monitor a volume of sponsored traffic and may update the criteria to steer this sponsored traffic to a preferred volume, for example a desired volume of access to a specific content. The content server 116 may monitor both the accumulation of data communication sponsorship charges and the volume of sponsored traffic and adjust the criteria based on both the accumulation of data communication sponsorship charges and on the volume of sponsored traffic.

The content served to the mobile electronic device 102 by the content server 116 may include advertising content in addition to the requested content. For example, a weather forecast requested by the mobile electronic device 102 may be provided to the mobile electronic device 102 as a hyper text markup language file comprising the subject weather forecast as well as one or more advertisements stitched into the hyper text markup language file to be presented at a top margin, a side margin, a bottom margin, or at an interior location of the weather forecast on a display of the mobile electronic device 102. The opportunity to advertise to and/or to provide an impression to a user of the mobile electronic device 102 may provide part of the motivation for the content provider paying for the data communication service for the mobile electronic device 102.

In an embodiment, the communication service provider that operates one or more of the base transceiver station 104, the packet data serving node 108, and the gateway 110 may collect information about the data communication services usage of the mobile electronic device 102 and provide this information, either in raw form or in summarized form, to the content server 116 and/or the content provider that operates the content server 116. The information may include universal reference locators accessed, time spent at specific content pages, click-throughs at specific content pages, and other behavioral information. The access to this data communication services usage may provide part of the motivation for the content provider paying for the data communication service for the mobile electronic device 102. The content provider may analyze the information to correlate data communication services used by the mobile electronic device 102 to purchasing activity of the mobile electronic device 102 and/or of a user of the mobile electronic device 102. For example, the content provider may analyze the information to determine what advertisements and/or types of advertisements most influence buying behavior, whereby the content provider may adopt their advertisement strategies to be more effective.

In an embodiment, the gateway 110 may grant a data connection to the mobile electronic device 102 while generating a billing record, for example an IPDR, that is associated to the mobile electronic device 102. The billing record may identify the mobile electronic device 102 using a unique identifier, for example a network equipment identifier (NEI), an electronic serial number (ESN), a subscriber phone number, or other unique identifier. The billing record may also identify the content server 116 and/or the content provider, for example using a code which is uniquely associated with the content server 116 and/or the content provider. Thereafter, the billing server 114 may respond to the billing record to bill the costs of the data connection to the content server 116 and/or the content provider associated with the content server 116. In an embodiment, the billing server 114 may process the billing record as it is received to allocate the cost to the content provider. The billing server 114 may keep track of how much money the content provider has paid to sponsor data sessions for the mobile electronic device 102 and this information may be presented in the monthly invoice for the communications services account associated with the mobile electronic device 102. Alternatively, in another embodiment, the billing server 114 may examine the monthly invoice of the communications services account associated with the mobile electronic device 102 and process the sponsored and/or free data sessions once a month, transferring costs to the appropriate one or more content providers who have accepted to pay for one or more data sessions. In an embodiment, the billing server 114 may enter a reverse charge and/or a credit to the account associated with the mobile electronic device 102 before determining the monthly invoice. In an embodiment, the billing server 114 may generate a periodic bill, for example a monthly bill, for an account associated with the mobile electronic device 102 that identifies the content source, the content provider, and/or the content server 116 as a sponsor for data connections used by the mobile electronic device 102 and/or the amount of costs incurred.

In an embodiment, the gateway 110 may add a code identifying a content provider and/or the content server 116 that has agreed to pay for a data session to the billing record, and the billing server 114 may allocate costs for data sessions based, at least in part, on the codes stored in the billing records. In an embodiment, the content provider and/or the content server 116 may be provided a single rolled up bill once per month or some other effective periodic interval indicating how much they owe for sponsored data sessions. The single rolled-up bill may be accompanied by a digest of data or raw data about the sponsored data sessions and/or the user behavior that the system 100 has monitored.

In an embodiment, the mobile electronic device 102 may be notified that it is navigating to content that obligates them to pay data communication costs. For example, when a user of the mobile electronic device 102 may be accustomed to having data communication costs borne by the content server 116, the user may become upset if the content server 116 withdraws their sponsorship without notice to the mobile electronic device 102. Additionally, in an embodiment, the mobile electronic device 102 may display an interface tile that provides ease of access to a content or web page, and the presentation of the tile may visually indicate whether accesses to the content is sponsored or not sponsored. While the description above indicates that the billing server 114 determines what party is to be billed for the data connection and, when called for, makes adjustments to bill the content provider, in some embodiments the gateway 110 may make this determination and build this information into the billing record before sending the billing record to the billing server 114.

Figure 2:
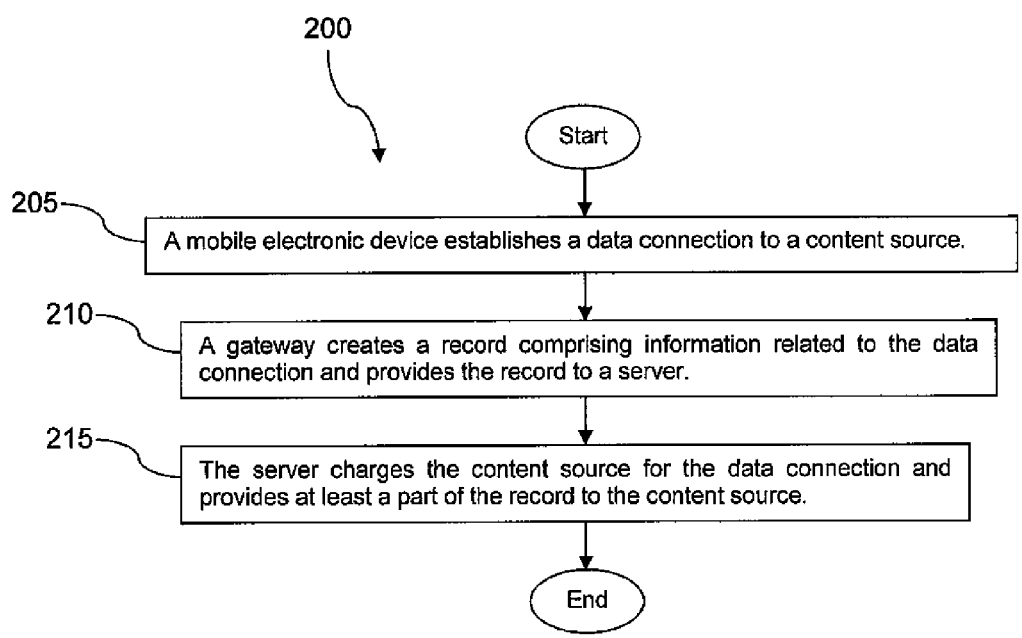
FIG. 2 is an illustration of a method according to an embodiment of the disclosure.

Turning now to FIG. 2, a method 200 of providing data communication services based on reverse billing is described. At block 205, the mobile electronic device 102 establishes a data connection to the content source, for example the content server 116. At block 210, the gateway 110 creates a record comprising information related to the data connection and provides the record to a server, for example to the billing server 114. At block 215, the server, for example the billing server 114, charges the content source, for example the content server 116 and/or the content provider, for the data connection communication service and provides at least part of the record to the content source. The record may comprise a unique identification associated with the mobile electronic device 102, for example a network equipment identifier (NEI), an electronic serial number (ESN), a subscriber phone number, and/or other identification. The record may further comprise information identifying what content the mobile electronic device 102 navigated to. In an embodiment, the record may further comprise a code that identifies the content source, for example the content server 116 and/or the content provider. In an embodiment, the method 200 may further comprise returning information to the mobile electronic device 102 that promotes the mobile electronic device 102 displaying information indicating that the data connection to the subject content is free and/or sponsored. In an embodiment, the charges for the data connection to the content source may be billed to an account associated with the mobile electronic device 102, and the content source, for example the content server 116, may pay for the data connection by the server providing a credit back to the account, for example a credit to a monthly flat fee subscription to a wireless communication service plan.

Figure 3:
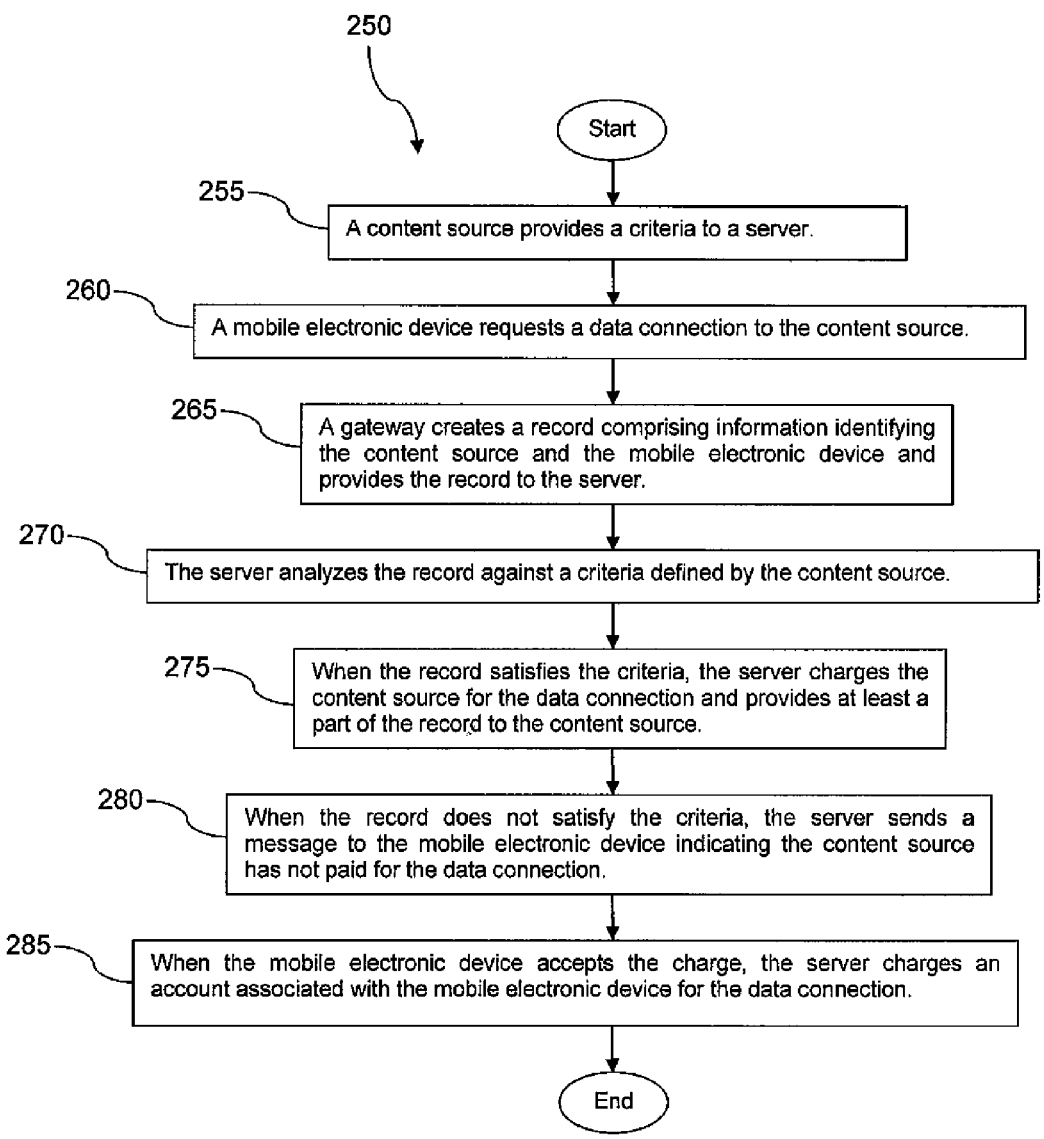
FIG. 3 is an illustration of another method according to an embodiment of the disclosure.

Turning now to FIG. 3, a method 250 of providing data communication services based on reverse billing is described. At block 255, the content source, for example the content server 116 and/or the content provider, provides a criteria to a server, for example the billing server 114. For example, the criteria may identify a list of mobile electronic devices 102 that are to receive sponsored data sessions and/or a list of mobile electronic devices 102 that are not to receive sponsored data sessions. Alternatively, the criteria may identify one or more demographic qualifications, for example a threshold income level, a threshold education level, a marital status, and other demographic conditions. Alternatively, the criteria may identify historical information, for example historical purchases. In an embodiment, the criteria may enumerate a plurality of conditions that are related using Boolean operators, for example OR operators, AND operators, NOT operators, and XOR operators.

At block 260, the mobile electronic device 102 establishes a data connection to the content source, for example to the content server 116. At block 265, the gateway 110 creates a record comprising information identifying the content source and the mobile electronic device 102. The gateway 110 provides the record to the billing server 114. At block 270, the server, for example the billing server 114, analyzes the record against the criteria provided in block 255. At block 275, when the record satisfies the criteria, the server, for example the billing server 114, charges the content source, for example the content server 116 and/or the content provider, for the data connection. The billing server 114 also provides at least part of the record to the content source. The billing server 114 may perform the activities of block 275 in a batch processing mode on a periodic basis, for example while compiling a monthly bill, invoice, or statement. Alternatively, the billing server 114 may perform the activities of block 275 substantially while the data connection is active.

At block 280, when the record does not satisfy the criteria, the server, for example the billing server 114, sends a message to the mobile electronic device 102 indicating that the content source has not agreed to pay for the data connection. At block 285, when the mobile electronic device 102 accepts the charge for establishing the data connection, for example when a user interface presented on the mobile electronic device 102 receives an input accepting payment of the data connection charges, the server, for example the billing server 114, charges an account associated with the mobile electronic device 102 for the data connection. The server may charge a subscription account associated with the mobile electronic device 102.

Figure 4:
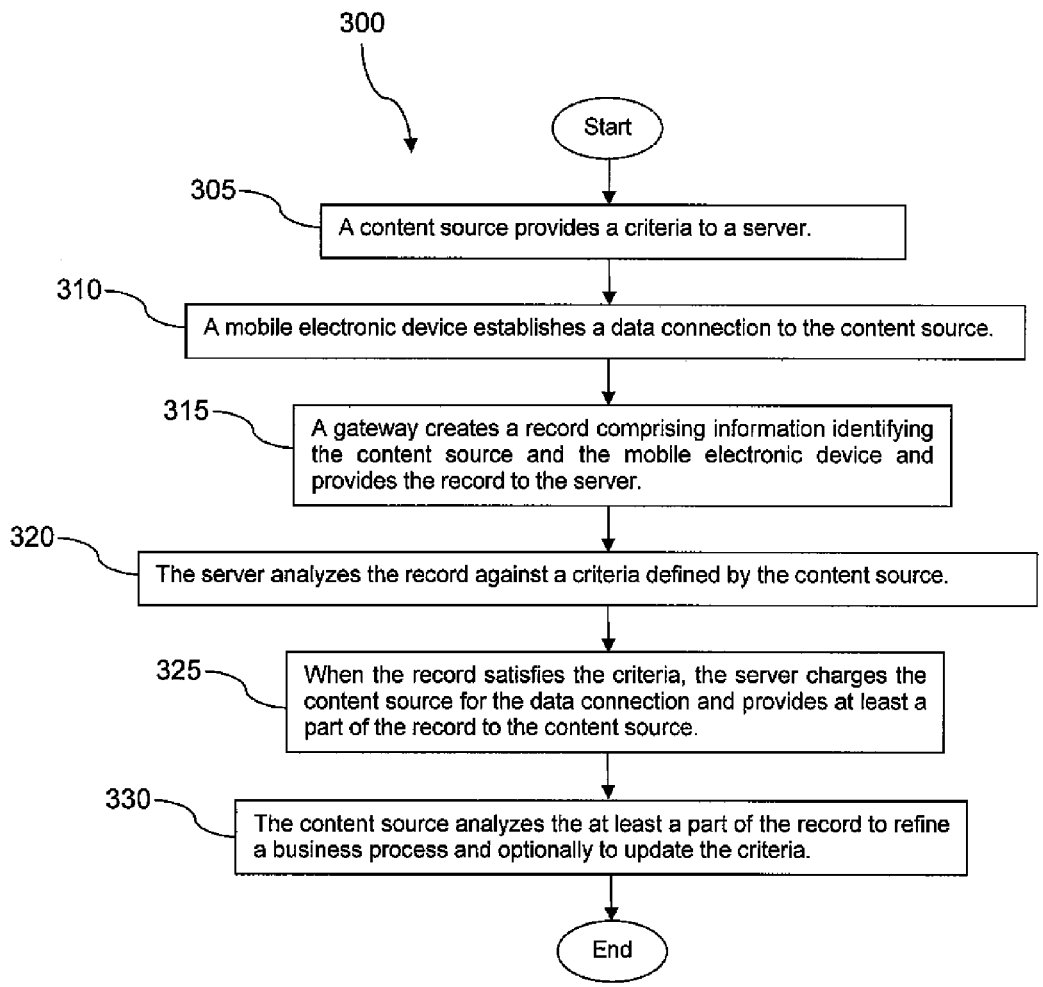
FIG. 4 is an illustration of another method according to an embodiment of the disclosure.

Turning now to FIG. 4, a method 300 of providing data communication services based on reverse billing is described.

The blocks 305 through block 325 correspond substantially to blocks 255 through block 275 described above with reference to FIG. 3, although unlike in method 250, in method 300 the data connection is established unconditionally. At block 325, if the content source, for example the content server 116, does not accept charges for the data connection, an account associated with the mobile electronic device 102 may be charged, for example a wireless communication services subscription account. At block 330, the content source, for example the content server 116 and/or the content provider, analyzes at least a part of the record (the record created by the gateway 110 when establishing the data connection from the mobile electronic device 102 to the content server 116) to refine a business process and optionally to update the criteria. For example, the content source may analyze sponsored data connections versus purchases made via its on-line retail outlet to determine an effectiveness of sponsoring the data connections. In an embodiment, the content source may discontinue sponsorship of data connections in view of lack of correlation between sponsored data connections and on-line retail purchases. Alternatively, in an embodiment, the content source may refine the criteria to sponsor data connections for mobile electronic devices 102 associated with specific demographic characteristics, for example an income level above a specific level, a credit score above a specific level, a geographical area or region within which the mobile electronic devices 102 are located, a current location of the mobile electronic devices 102, a home address associated with a user of the mobile electronic devices 102, and like information.

The content source may analyze at least some of the information from the record to understand general electronic shopper behavior. The content source may analyze the record to identify targeted advertisements to stitch into content provided to the mobile electronic device 102 in the future, via either a sponsored data connection or a non-sponsored data connection. For example, the content server 116 may be provided with a table or other list that includes an index from the unique identifier associated with the mobile electronic device 102 to a specific targeted advertisement or class of targeted advertisements. When the mobile electronic device 102 requests content from the content server 116, the content server 116 can select a targeted advertisement based on the unique identifier associated with the mobile electronic device, stitch the targeted advertisement into the requested content, and return the requested content and targeted advertisement to the mobile electronic device 102.

Additionally, in an embodiment, the content server 116 may update the criteria from time to time, either occasionally as deemed appropriate or periodically, based in part on the record or based in part on an accumulation of the records, as described above. For example, the content server 116 may update the criteria based in part on the record and/or records and based in part on the accumulation of sponsored charges for data connections over a period of interest, for example over a monthly period or some other time period. The content server 116 may update the criteria based in part on the record and/or records and based in part on achieving or not exceeding a budget for sponsored charges for data connections. The content server 116 may update the criteria based in part on the record and/or records and based in part on achieving a target for accesses to a specific content. The content server 116 may update the criteria based on a combination of the above identified factors.

Figure 5:
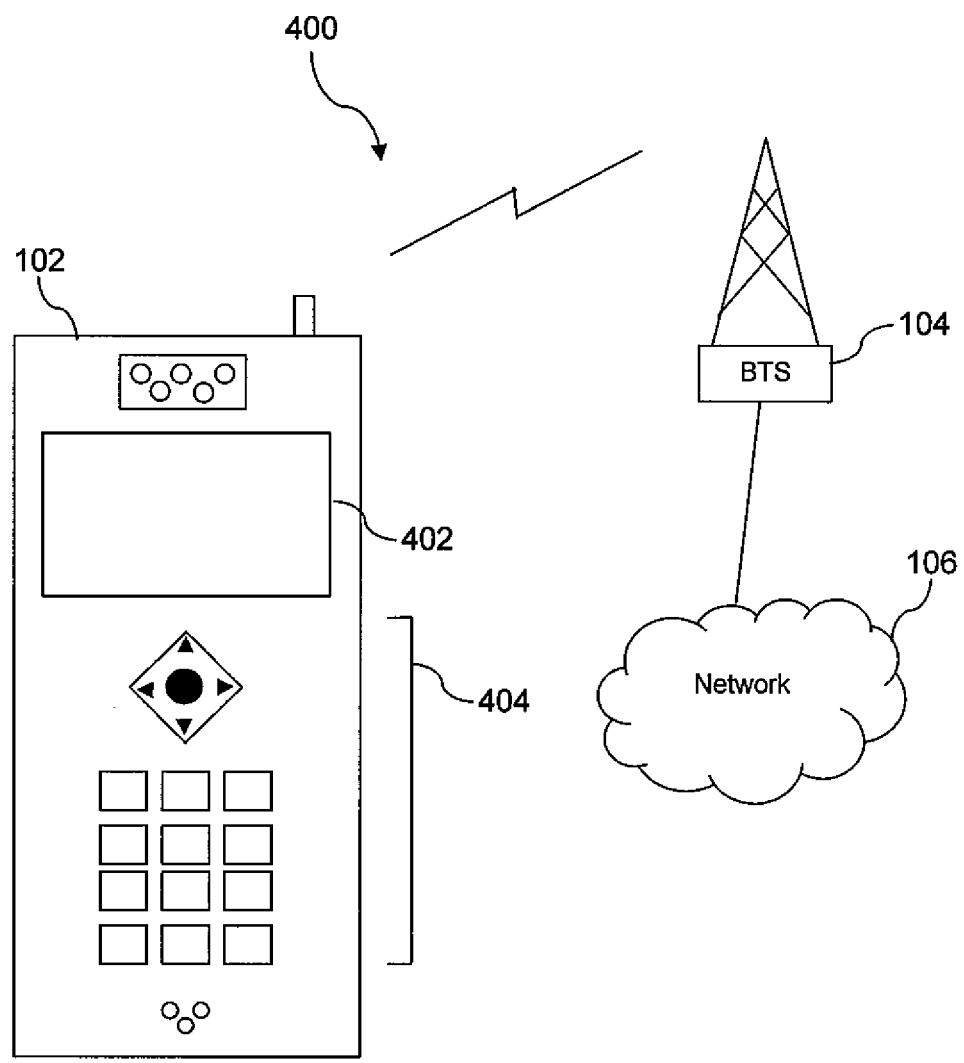
FIG. 5 is an illustration of a mobile electronic device according to an embodiment of the disclosure.

FIG. 5 depicts the mobile electronic device 102, which is operable for implementing aspects of the present disclosure, but the present disclosure should not be limited to these implementations. Though illustrated as a mobile phone, the mobile electronic device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile electronic device 102 is not a general purpose computing device like a portable, laptop or tablet computer, but rather is a special-purpose communications device such as a mobile phone, wireless handset, pager, or PDA. The mobile electronic device 102 may support specialized activities such as gaming, inventory control, job control, and/or task management functions, and so on.

The mobile electronic device 102 includes a display 402 and a touch-sensitive surface or keys 404 for input by a user. The mobile electronic device 102 may present options for the user to select, controls for the user to actuate, and/or cursors or other indicators for the user to direct. The mobile electronic device 102 may further accept data entry from the user, including numbers to dial or various parameter values for configuring the operation of the handset. The mobile electronic device 102 may further execute one or more software or firmware applications in response to user commands. These applications may configure the mobile electronic device 102 to perform various customized functions in response to user interaction. Additionally, the mobile electronic device 102 may be programmed and/or configured over-the-air, for example from the base transceiver station 104, a wireless access point, or a peer mobile electronic device 102.

Figure 6:
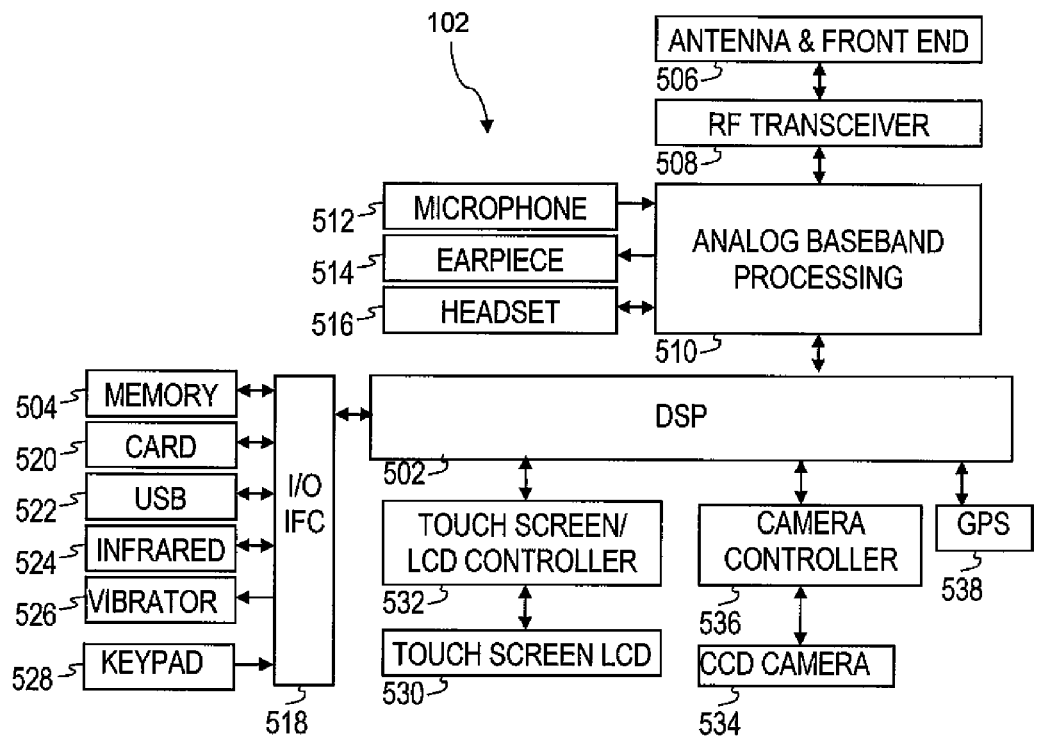
FIG. 6 is a block diagram of a mobile electronic device according to an embodiment of the disclosure.

FIG. 6 shows a block diagram of the mobile electronic device 102. While a variety of known components of handsets 102 are depicted, in an embodiment a subset of the listed components and/or additional components not listed may be included in the mobile electronic device 102. The mobile electronic device 102 includes a digital signal processor (DSP) 502 and a memory 504. As shown, the mobile electronic device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile electronic device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile electronic device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile electronic device 102 to send and receive information from a radio access network (RAN) or some other available wireless communications network or from a peer mobile electronic device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RE signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile electronic device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile electronic device 102 to function as a peripheral device to exchange information with a personal computer or other computer system. The infrared port 524 and other optional ports such as a Bluetooth interface or an IEEE 802.11 compliant wireless interface may enable the mobile electronic device 102 to communicate wirelessly with other nearby handsets and/or wireless base stations.

The input/output interface 518 may further connect the DSP 502 to the vibrator 526 that, when triggered, causes the mobile electronic device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile electronic device 102. Another input mechanism may be the touch screen LCD 530, which may also display text and/or graphics to the user. The touch screen LCD controller 532 couples the DSP 502 to the touch screen LCD 530.

The CCD camera 534 enables the mobile electronic device 102 to take digital pictures. The DSP 502 communicates with the CCD camera 534 via the camera controller 536. The GPS sensor 538 is coupled to the DSP 502 to decode global positioning system signals, thereby enabling the mobile electronic device 102 to determine its position. In another embodiment, a camera operating according to a technology other than charge coupled device cameras may be employed. Various other peripherals may also be included to provide additional functions, e.g., radio and television reception.

Figure 7:
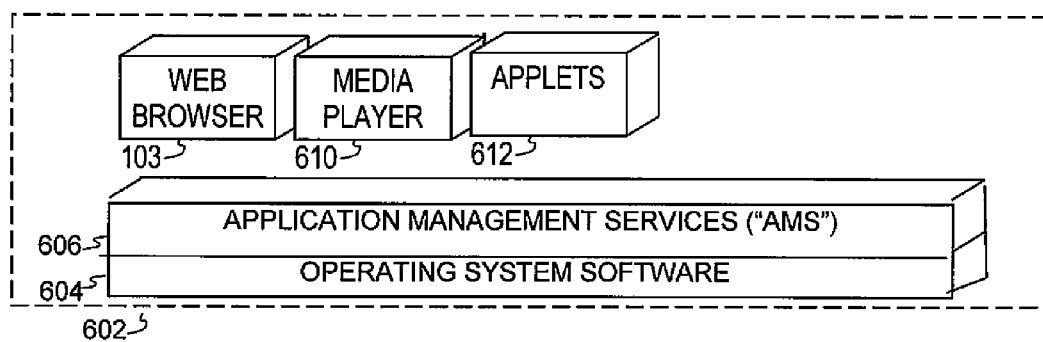
FIG. 7 is a block diagram of a software architecture of a mobile electronic device according to an embodiment of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile electronic device 102. Also shown in FIG. 7 are the web browser 103, a media player application 610, and JAVA applets 612. The web browser 120 configures the mobile electronic device 102 to operate as a web browser, allowing a user to enter information into forms and select links to retrieve and view web pages. The media player application 610 configures the mobile electronic device 102 to retrieve and play audio or audiovisual media. The JAVA applets 612 configure the mobile electronic device 102 to provide games, utilities, and other functionality.

Figure 8:
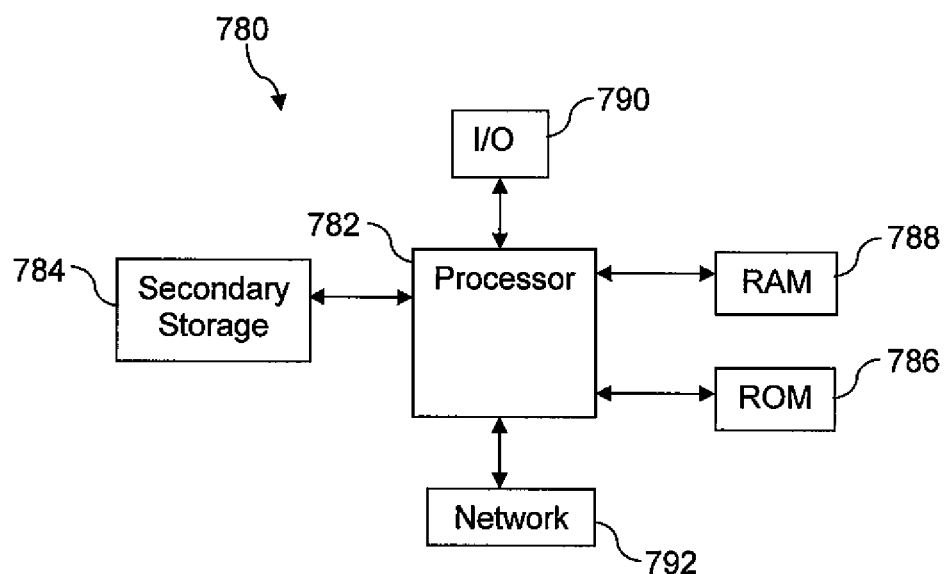
FIG. 8 is an illustration of a computer system suitable for implementing some aspects of an embodiment of the disclosure.

Some aspects of the system described above may be implemented on a computer with sufficient processing power, memory resources, and network throughput capability to handle the workload placed upon it. FIG. 8 illustrates a computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), worldwide interoperability for microwave access (WiMAX) radio transceiver cards, and/or long term evolution (LTE), and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps.

Communications and/or information may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. In some contexts, hard disk, floppy disk, optical disk, and other readable media may be referred to as computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing data communication services, comprising:
   receiving, by a gateway, a request from a mobile electronic device to establish a data connection to a content source;
   creating, by the gateway, a billing record comprising information identifying the content source and the mobile electronic device;

providing, by the gateway, the billing record to a server;

determining, by the server, whether a user profile associated with the mobile electronic device satisfies a data connection sponsorship criteria defined by the content source, wherein the data connection sponsorship criteria comprises an adjustable criteria based on whether charges associated with the data connection sponsorship exceed the content source's monthly budget for the data connection sponsorship, and wherein the server determines whether the user profile associated with the mobile electronic device satisfies the data connection sponsorship criteria in response to the gateway providing the billing record to the server;

charging, by the server, the content source for the data connection and providing information from the billing record to the content source when the user profile associated with the mobile electronic device satisfies the data connection sponsorship criteria and the content and when the data sponsorship criteria indicates the monthly budget for the data connection sponsorship has not been exceeded;

sending, by the server, a message to the mobile electronic device indicating the content source has not paid for the data connection when the user profile associated with the mobile electronic device does not satisfy the data connection sponsorship criteria or when the data sponsorship criteria indicates the monthly budget for the data connection sponsorship has been exceeded;

receiving, by the server, an input from the mobile electronic device to accept a charge for the data connection in response to sending the message; and charging, by the server, an account associated with the mobile electronic device for the data connection in response to the server receiving the input from the mobile electronic device to accept the charge for the data connection.

2. A method of providing data communication services, comprising:

receiving, by a gateway, a request from a mobile electronic device to establish a data connection to a content source;

creating, by the gateway, a billing record comprising information related to the data connection;

providing, by the gateway, the billing record to a server;

charging, by the server, the content source for the data connection;

providing, by the server, at least a part of the billing record to the content source;

charging, by the server, an account associated with the mobile electronic device for the data connection;

entering, by the server, a reverse charge to the account associated with the mobile electronic device subsequent to charging the account associated with the mobile electronic device and before generating an invoice for the account associated with the mobile electronic device;

generating, by the server, the invoice for the account associated with the mobile electronic device that identifies the content source as a sponsor for the data connection;

receiving, by the gateway, a second request from a second mobile electronic device to establish a second data connection to a second content source;

creating, by the gateway, a second billing record comprising information related to the second data connection;

providing, by the gateway, the second billing record to the server;

determining, by the server, whether a user profile associated with the second mobile electronic device satisfies a data connection sponsorship criteria defined by the second content source, wherein the user profile comprises demographic information about a user of the second mobile electronic device;

charging, by the server, the second content source for the second data connection and providing information from the second billing record to the second content source when the user profile associated with the second mobile electronic device satisfies the data connection sponsorship criteria;

sending, by the server, a message to the second mobile electronic device indicating the second content source has not paid for the second data connection when the user profile associated with the second mobile electronic device does not satisfy the data connection sponsorship criteria; and charging, by the server, an account associated with the second mobile electronic device for the second data connection when the server receives an input from the second mobile electronic device to accept a charge for the second data connection in response to the message.

3. A method of providing data communication services, comprising:

receiving, by a gateway, a request from a mobile electronic device to establish a data connection to a content source;

creating, by the gateway, a billing record comprising information related to the data connection;

providing, by the gateway, the billing record to a server;

charging, by the server, the content source for the data connection;

providing, by the server, at least a part of the billing record to the content source;

charging, by the server, an account associated with the mobile electronic device for the data connection;

entering, by the server, a reverse charge to the account associated with the mobile electronic device subsequent to charging the account associated with the mobile electronic device and before generating an invoice for the account associated with the mobile electronic device;

generating, by the server, the invoice for the account associated with the mobile electronic device that identifies the content source as a sponsor for the data connection;

collecting, by a communication service provider that operates the gateway, communication services usage data of the mobile electronic device, wherein the communication services usage data tracks details of user interactions with at least one website during the data connection charged to the content source;

providing, by the communication service provider, the collected communication services usage data of the mobile electronic device to the content source;

receiving, by the gateway, a second request from a second mobile electronic device to establish a second data connection to a second content source;

creating, by the gateway, a second billing record comprising information related to the second data connection;

providing, by the gateway, the second billing record to the server;

determining, by the server, whether a user profile associated with the second mobile electronic device satisfies a data connection sponsorship criteria defined by the second content source, wherein the user profile comprises demographic information about a user of the second mobile electronic device; and charging, by the server, the second content source for the second data connection and providing information from the second billing record to the second content source when the user profile associated with the second mobile electronic device satisfies the data connection sponsorship criteria.

\* \* \* \* \*